United States Patent [19]

Cavanagh

[11] Patent Number: 5,298,056
[45] Date of Patent: Mar. 29, 1994

[54] DIRECT STEEL-MAKING PROCESS

[75] Inventor: Patrick E. Cavanagh, Toronto, Canada

[73] Assignee: Virgin Metals (Canada) Limited, Toronto, Canada

[21] Appl. No.: 2,011

[22] Filed: Jan. 8, 1993

[30] Foreign Application Priority Data

Jan. 9, 1992 [GB] United Kingdom ................. 9200423

[51] Int. Cl.$^5$ ............................................. C22B 1/16
[52] U.S. Cl. ............................................................ 75/436
[58] Field of Search ............................................. 75/436

[56] References Cited

U.S. PATENT DOCUMENTS

| | | |
|---|---|---|
| 2,287,663 | 6/1942 | Brassert . |
| 2,290,734 | 7/1942 | Brassert ............................ 75/436 |
| 2,296,498 | 9/1942 | Brassert . |
| 2,367,262 | 1/1945 | Brassert ............................ 75/436 |
| 2,925,337 | 2/1960 | Kalling et al. .................... 75/436 |
| 4,033,559 | 7/1977 | Pietsch ............................... 75/436 |

FOREIGN PATENT DOCUMENTS

| | | |
|---|---|---|
| 0262353 | 4/1988 | European Pat. Off. . |
| 980428 | 1/1965 | United Kingdom . |
| 1219674 | 1/1971 | United Kingdom . |
| 2041413 | 9/1980 | United Kingdom . |

Primary Examiner—Melvyn J. Andrews
Attorney, Agent, or Firm—Sim & McBurney

[57] ABSTRACT

Steel sheet is formed directly from iron ore concentrate by reducing a bed of iron ore concentrate, particularly high purity magnetized magnetic gamma hematite, to a low density hot cake of carburized metallic iron and then hot rolling the hot cake to a metallic sheet of full density (meeting market specification).

14 Claims, 7 Drawing Sheets

DISCHARGE END AND HOT MILLS TRAVELLING GRATE FURNACE FOR DIRECT REDUCED AND HOT ROLLED STEEL SHEET

DIRECT STEEL-MAKING PROCESS

FIELD OF INVENTION

The present invention relates to a novel steel-making process.

BACKGROUND TO THE INVENTION

Steel sheet is conventionally formed by initially casting molten steel into large ingots or slabs, which then are hot and cold rolled to the desired thickness. As far as the applicants are aware, there has not been any prior proposal to produce steel sheet directly from iron ore, particularly steel sheet with a fine grain structure.

SUMMARY OF INVENTION

In accordance with the present invention, there is provided a method of making thin steel sheet, which comprises reducing a bed of particulate iron ore or concentrate to a hot cake of metallic iron, and compacting the hot cake to a metal sheet.

Thin steel sheet meeting specifications for most present day industrial uses can be made directly from high purity iron ore concentrates, without melting, using the method described herein.

DESCRIPTION OF PREFERRED EMBODIMENT

Figure 1:
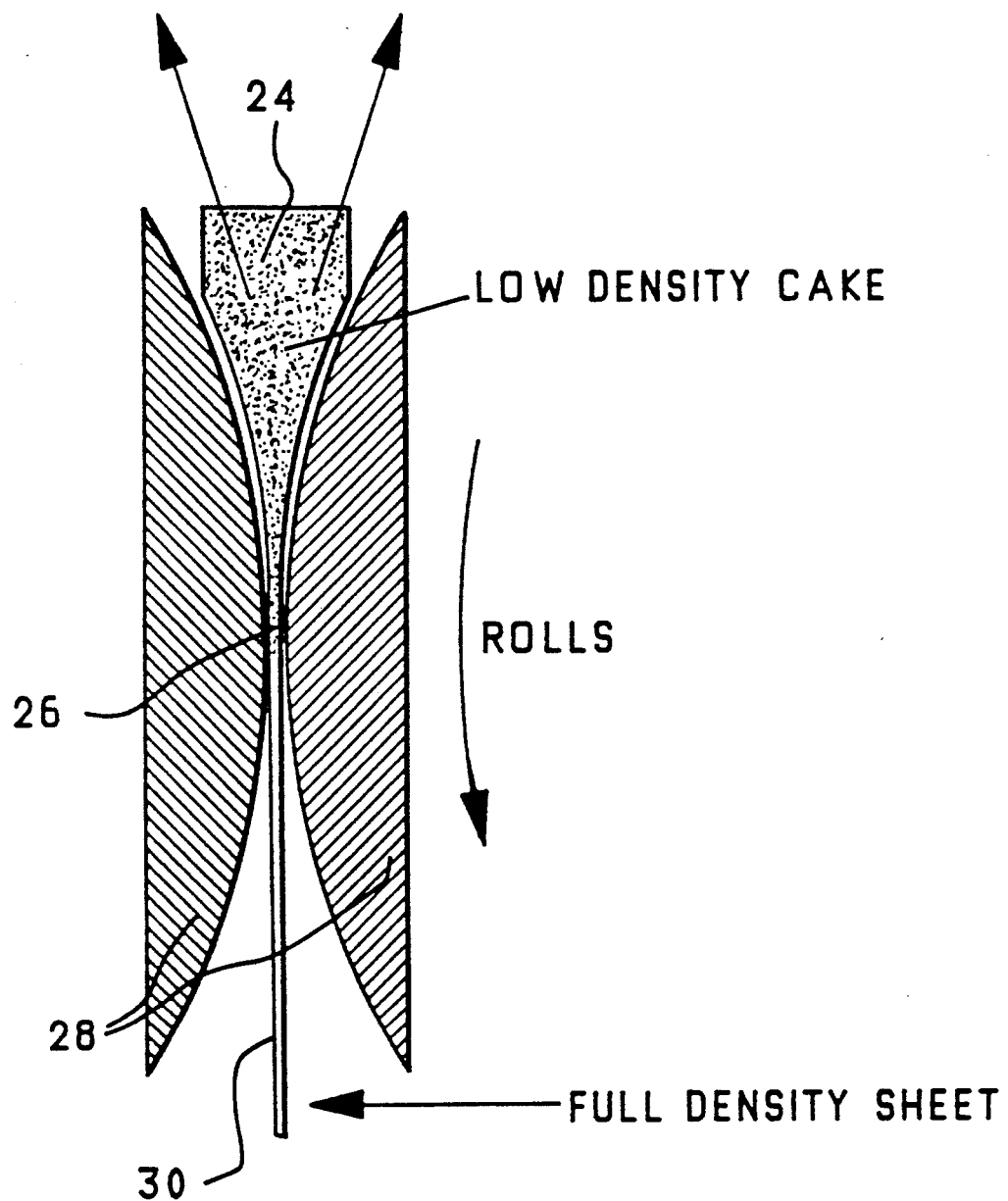
FIG. 1 illustrates the production of thin steel sheet from a low density metal cake produced by reduction of high purity iron ore, by the use of a rolling mill, in accordance with one aspect of the invention.
Figure 2A:
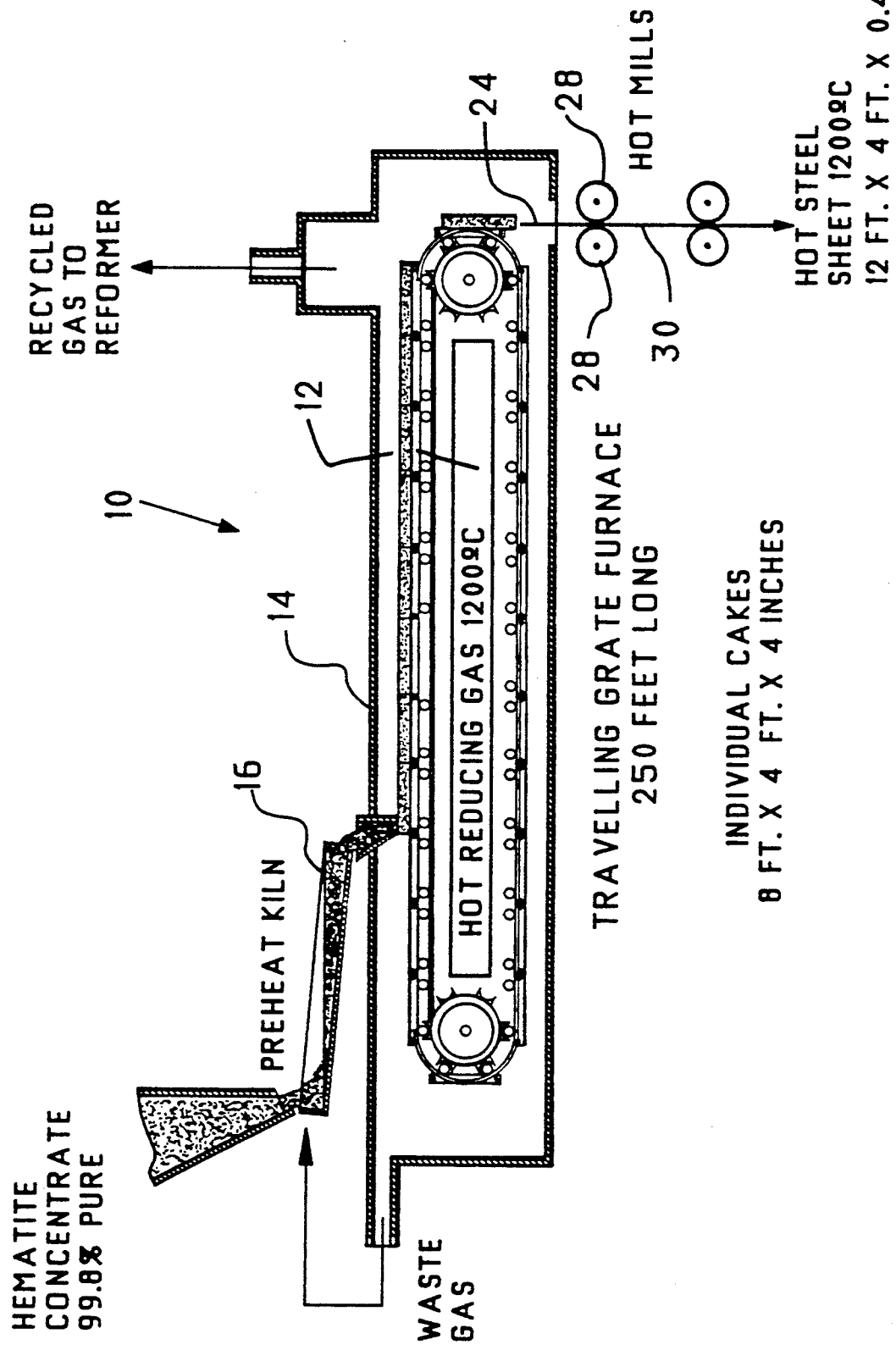
FIG. 2(a) is a schematic representation of one embodiment of a steel-making apparatus for effecting the process of the invention.
Figure 2B:
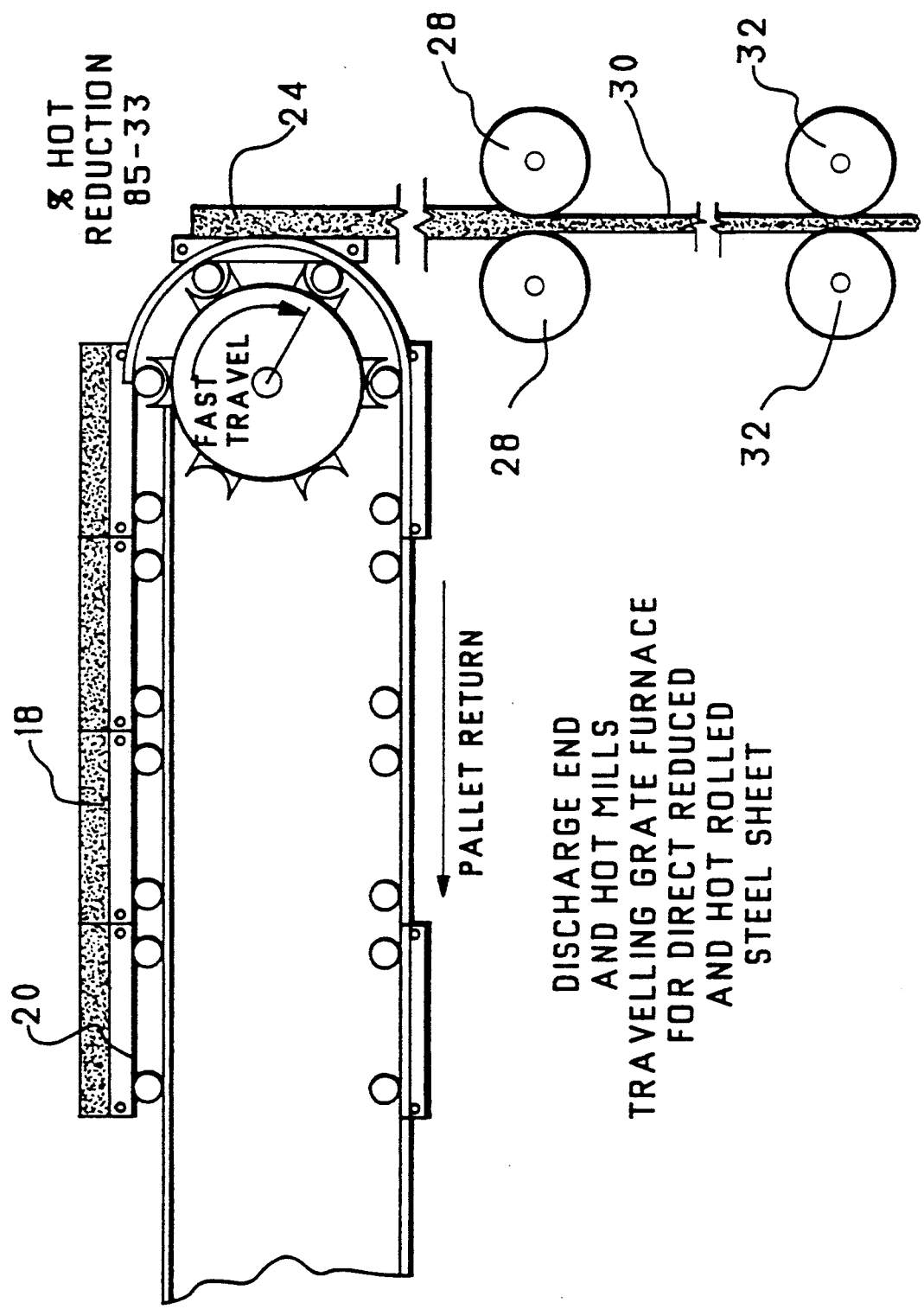
FIG. 2(b) is a close-up view of the discharge end of the apparatus of FIG. 2(a)
Figure 2C:
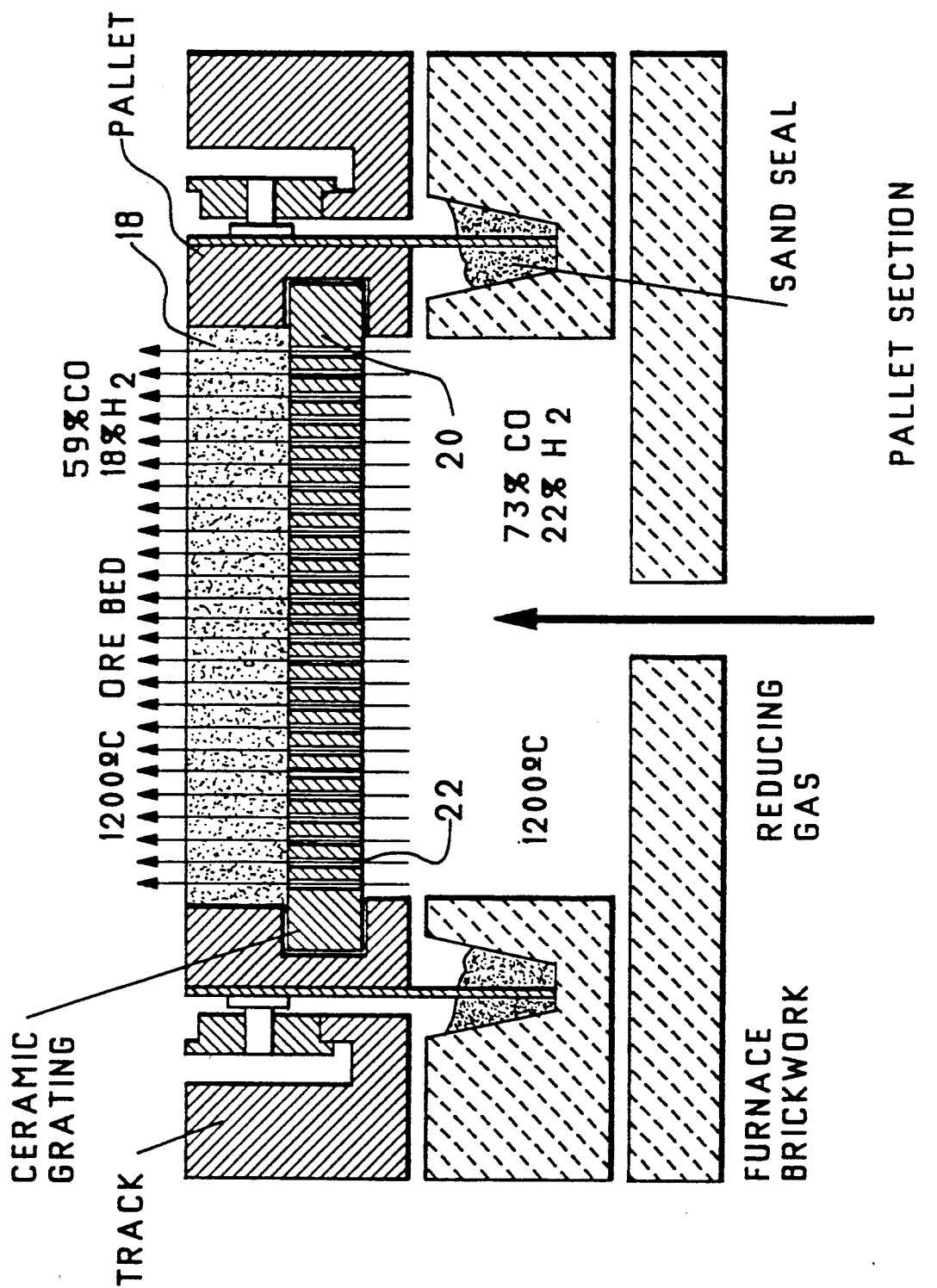
FIG. 2(c) is a sectional view of the pallet section of the apparatus of FIG. 2(a)

Referring to FIGS. 1 and 2(a) to 2(c), an apparatus 10 for effecting the process of the invention comprises a horizontal travelling grate furnace 12, enclosed within a housing 14 to permit a reducing gas atmosphere to be provided. Other furnaces may be employed such as batch furnaces (see FIG. 3) or shaft furnaces.

A preheat kiln 16 is provided at the upstream end of the grate to permit particles of iron ore concentrate feed to be preheated to the reducing temperature. The iron ore concentrate may be any desired composition, but preferably comprises magnetic gamma hematite of high purity, preferably +99.5% pure.

The particle size of the iron ore concentrate determines the hot rolled grain size in the steel sheet produced from the concentrate. In general, the concentrate is sized all minus 10 mesh with less than 15% minus 200 mesh, preferably from minus 50 mesh to plus 200 mesh.

The preheated particulated iron ore concentrate is deposited as a bed 18 onto articulated grates 20 to the desired depth and bulk density. The grates 20 have a plurality of openings 22 formed therethrough to permit the reducing gas to pass through the bed 18.

The bed of iron ore concentrate generally has a bulk density of about 150 to about 250 pounds per cubic foot, preferably about 175 to about 200 pounds per cubic foot (about 2.0 to 3.0 g/cc). The bed depth generally is at least about 6 times the spacing between the gas flow openings 22, so as to develop sufficient back pressure on the reducing gas passing through the openings 22 to distribute the gas between the openings and provide a uniform gas flow and distribution in the bed. For example, there may be provided one sixteenth inch holes through one inch thick grates, with the hole spacing less than one-tenth bed thickness. The iron ore concentrate bed depth preferably is a maximum one inch per foot of bed width. The ore concentrate bed 18 may have any desired transverse and longitudinal dimensions, depending on the size of steel sheet desired to be produced.

A reducing gas stream having a temperature sufficient to reduce the metal oxide to metallic form but insufficient to form molten metal from the reduced metal oxide, is passed through the openings 22 in the grate into and through the ore concentrate bed 18. In general, the temperature of the gas stream ranges from about 1150° to about 1300° C., preferably approximately 1200° C.

The reducing gas stream preferably is provided by a mixture of carbon monoxide and hydrogen, preferably in a ratio of $CO:H_2$ of from about 2:1 to about 3:1. The reducing gas mixture preferably is supplied at a minimum rate of about 2500 cubic meters per metric ton of iron produced (80,000 cu ft/2000 lbs of iron). Employing a reducing gas temperature of about 1200° C., reduction of high purity magnetic gamma hematite to hot metallic iron is effected in less than one hour.

Following reduction of the metal oxide to metal, the metal cake so formed is maintained at the reduction temperature, i.e. preferably approximately 1200° C., and exposed to a carbon gas atmosphere, such as the equilibrium mixture of carbon monoxide and carbon dioxide, for a sufficient time to provide a desired level of carburizing to control the carbon content of the steel and to sinter the metal particles together to form a hot, lightweight, porous steel cake for discharge from the grate furnace housing 14.

The porous steel cake 24 generally is formed with a thickness 6.66 times the desired thickness of hot-rolled sheet to be produced therefrom by rolling the cake to 15% of cake thickness. The cake is passed through the nip 26 between a first pair of counter-rotating rolls 28, which cause compaction of the metal particles in the sheet to the full density (i.e. 7.8 g/cc) of a hot-rolled sheet 30 and at the same time causing elongation of the sheet. The cake 24 is fed through the nip 26 at the same rate as the rate of rotation of the rolls 28 and the desired rate of feed typically is achieved by dropping the cake vertically into the nip 26 and acquiring the required speed by the effect of gravity. A hot one-inch thick steel cake at 1200° C. may be reduced 85% in thickness by rolling in the first pass to full density at 0.15 inches thickness.

The hot steel cake is of low density and high porosity such as to permit all gases contained in the porous structure to be squeezed out of the cake as it is rolled, as seen schematically in FIG. 1. However, the hot steel cake should have sufficient strength to permit it to be rolled to a sheet in the first hot pass.

The use of a closed die to press the cake to the same thickness would entrap enclosed gases, so that the resulting steel sheet would have less desirable properties than those developed by the direct rolling method described above.

In addition to forming individual steel sheets from individual hot, low density steel cakes, a long continuous strip of hot, low density steel cake, for example, three feet wide by one inch thick, may be formed and processed to provide a continuous hot-rolled steel strip, by feeding the continuous cake strip through the rolls 28 at the rate of rotation of the rolls 28.

However, when, for example, the product to be made is twenty gauge, three foot by eight foot corrugated siding, there is no need for a long continuous cake nor to provide equipment to make, and store large coils of steel sheet, but rather individual hot cakes may be formed to provide the end product at design dimensions.

Pilot plant tests have shown that long furnaces (say 250 feet long), using a travelling grate system can produce the individual cakes 24 at about 10 feet per minute and these individual cakes then can be fed to a standard rolling mill 28 at about 10 feet per second.

Rolling of steel elongates the sheet and hence the steel sheet must move relative to the roll face as it is compressed and elongated. When rolling low density steel cakes, the relative motion is not as great, and involves a much smaller area of roll face. Edge rolling may be used to limit spread to 10% of cake width. An increase of more than 50% in length is the required level to indicate that the sheet has been sufficiently worked after reaching full density (namely 7.8 g/cc).

The following Table I provides typical results for a single pass hot rolling of low density porous cake to full density:

TABLE 1

| | DIMENSIONS | | | | | WEIGHTS | | |
|---|---|---|---|---|---|---|---|---|
| T Inches | L Ft. | W Ft. | Area Sq. Ft. | Vol. Cu. Ft. | Density Lbs/ cu. ft. | Lbs. | Weight Lbs./ sq. ft. |
| Low Density Cake | | | | | | | |
| 1.00 | 0.83 | 1.0 | 1.0 | 0.083 | 200.0 | 16.60 | 16.60 |
| Reduced Low Density Cake | | | | | | | |
| 1.00 | 0.083 | 1.0 | 1.0 | 0.083 | 140.0 | 11.62 | 11.62 |
| Rolled Steel Sheet | | | | | | | |
| 0.153 | 0.013 | 1.68 | 1.10 | 1.85 | 0.024 | 490 | 11.62 | 6.25 |

This pass gives #9 gauge sheet - maximum square feet/ton - 320
cold finishing to #20 gauge - maximum square feet/ton - 1000
(0.0368" thick -1.5 Lbs/Square foot)

As mentioned above, it is conventional practice to make steel sheets from large ingots or slabs cast from molten metal. While solidifying and cooling, large crystals or grains grow in the metal. Hot and cold rolling of the steel sheet to the final desired size reduces the grain size to much finer sizes to provide increased strength and toughness.

The steel sheet produced by the present invention has a fine grain size in the hot rolled state, mainly due to the fine particle size of the starting ore concentrate feed. The direct steel process described herein provides a means of controlling hot rolled grain size in the steel, by controlling the iron ore concentrate particle size.

The hot-rolled steel sheet 30 has the same grain structure and ductility as standard hot rolled steel has after the standard steel sheet has been further cold rolled and annealed to refine and improve its grain structure and ductility.

The hot-rolled steel sheet 30 may be subjected to further hot or cold rolling and annealing methods to meet steel of the same analysis. For example, the sheet may be cold-rolled by additional counter-rotating rolls 32 to decrease the thickness from 0.15 inch to 0.1 inch to form a steel sheet 34.

Figure 3:
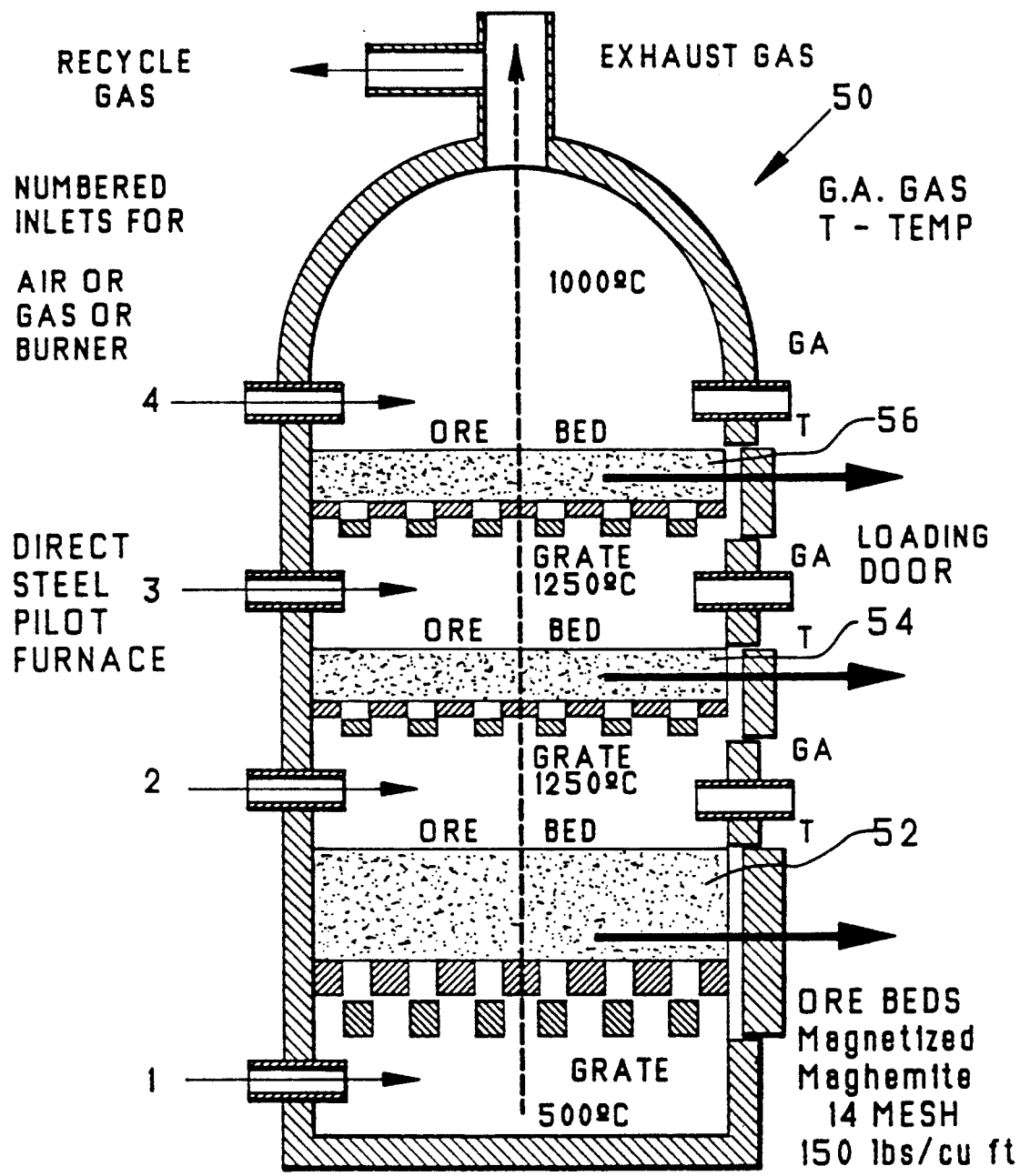
FIG. 3 is sectional view of another embodiment of steel-making apparatus for effecting the process of the invention.
Figure 4:
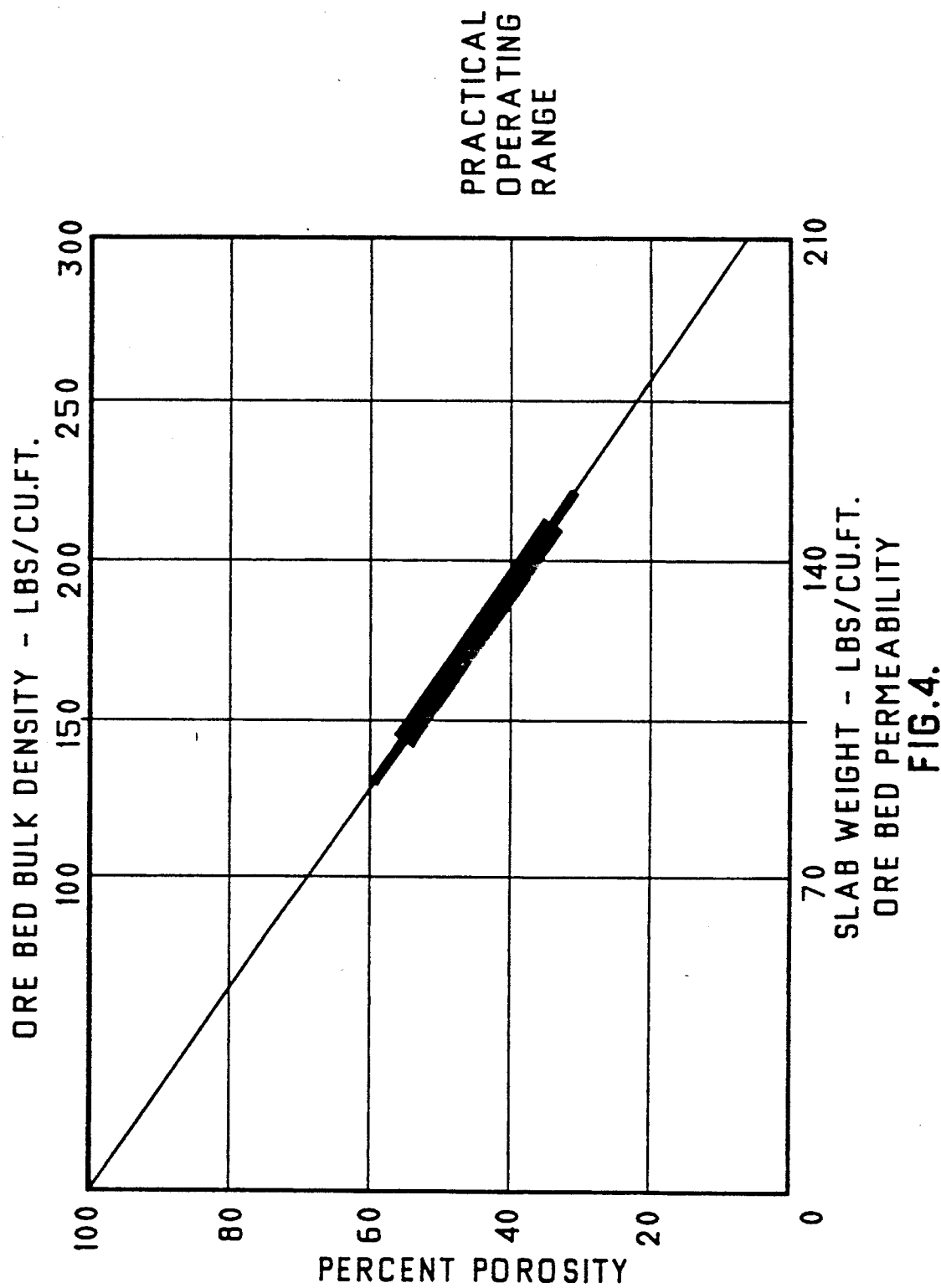
FIG. 4 depicts graphically the relationships determining ore bed permeability for economic operation.
Figure 5:
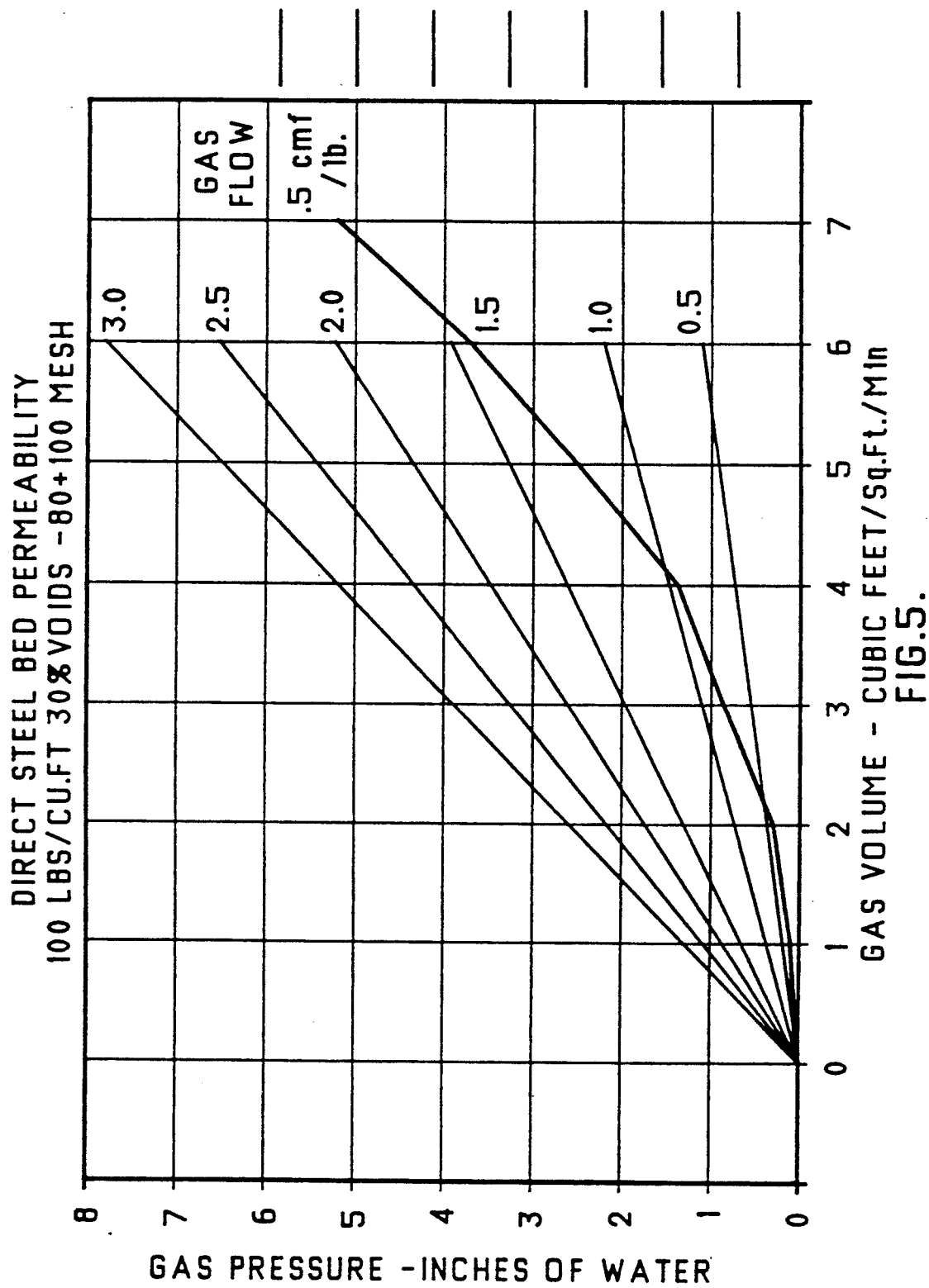
FIG. 5 depicts graphically the relationship of gas pressure to gas volume.

In FIG. 3, there is illustrated a batch furnace 50 wherein there is upward gaseous flow through first a coke bed 52 and then through two permeable beds 54, 56 of magnetized maghemite iron ore, to form a hot porous steel cake by reduction. FIG. 5 illustrates the required gas pressure for various bed depths to provide a desired gas flow of 0.5 cu ft/lb of ore for an iron concentrate feed of known bulk density of 100 lb/cu ft. FIG. 4 illustrates the practical limits of ore concentrate bulk density and bed porosity for operating the system profitably.

While the method of the invention mainly is useful in producing a single layer steel sheet, the procedure also may be employed to form a multiple layer structure, by providing a bed 18 of suitable layers of oxides. One novel cladding material which may be made by forming a three layer rust-resistant steel sheet which is formed from a layered oxide mass comprising:

First layer—nickel oxide/concentrate mix—15%
Second layer—concentrate—70%
Third layer—nickel oxide/concentrate—15%

Such cladding mixture may contain 4% nickel oxide or 12% nickel oxide.

SUMMARY OF DISCLOSURE

In summary of this disclosure, the present invention provides coherent, permeable, low-density metal shapes with the required strength to allow mechanical handling and hot rolling to a full density product and hence a direct steel making procedure from iron ore concentrate. Modifications are possible within the scope of this invention.

What I claim is:

1. A method of making steel, which comprises:
   forming a gas-permeable bed of particulate iron ore or concentrate,
   passing a reducing gas through said particulate iron ore or concentrate to form a coherent porous hot cake of metallic iron in which sintered metal particles are fused to one another, and
   compacting the hot cake to a metal sheet.

2. A method of making steel, which comprises:
   reducing a bed of particulate iron ore or concentrate to a hot cake of metallic iron, said iron ore being magnetic gamma hematite containing less than about 0.5 wt % impurities, and
   compacting the hot cake to a metal sheet.

3. The method of claim 2 wherein said magnetic gamma hematite is magnetized.

4. A method of making steel, which comprises:
   reducing a bed of particulate ore or concentrate to a hot cake of metallic iron, said bed of particulate iron ore having a bulk density of about 150 to about 250 pounds per cubic foot and is composed of particles of iron ore concentrate sized minus 50 mesh and plus 200 mesh, and
   compacting the hot cake to a metal sheet.

5. The method of claim 4 wherein sad bed of particulate iron ore is reduced by passing a reducing gas stream comprising a mixture of carbon monoxide and hydrogen through said bed of iron ore at a temperature at least sufficient to effect said reduction but not sufficient to melt the iron.

6. The method of claim 5 wherein said reducing gas stream comprises a mixture of carbon monoxide and hydrogen having a ratio of 2 $CO:H_2$ to 3 $CO:H_2$.

7. The method of claim 6 wherein said reduction is effected at a temperature of about 1150° to about 1300° C.

8. The method of claim 7 wherein said temperature is about 1200° C.

9. The method of claim wherein said hot cake is exposed to a carbon gas atmosphere for a sufficient time to provide a desired level of carburizing of metal in said cake prior to said compacting step.

10. The method of claim 9 wherein said carbon gas atmosphere is provided by a mixture of carbon monoxide and carbon dioxide.

11. A method of making steel, which comprises:
reducing a bed of particulate iron ore or concentrate to a hot cake of metallic iron, and
compacting the hot cake in such manner as to expel gases from said cake and to provide a metal sheet having a full density of about 7.8 g/cc.

12. The method of claim 11 wherein said compaction is effected by feeding said cake through a nip between counter-rotating rollers at a linear speed corresponding to the rotational speed of the rollers.

13. The method of claim 12 wherein said cake is hot rolled to a thickness of no greater than about 15% of the cake thickness.

14. The method of claim 12 wherein said cake is hot rolled to a length corresponding to an elongation of at least about 50% of the length of the cake.

* * * * *